United States Patent [19]

Sawa et al.

[11] Patent Number: 4,957,194
[45] Date of Patent: Sep. 18, 1990

[54] TORQUE CONVERTER SLIP CONTROL DEVICE

[75] Inventors: Kenji Sawa; Susumu Kuromida; Keiji Bota, all of Hiroshima, Japan

[73] Assignee: Mazda Motor Corporation, Hiroshima, Japan

[21] Appl. No.: 242,282

[22] Filed: Sep. 8, 1988

[30] Foreign Application Priority Data

Sep. 8, 1987 [JP] Japan .................. 62-224728
Oct. 27, 1987 [JP] Japan .................. 62-269210

[51] Int. Cl.⁵ .................. F16H 45/02; B60K 41/02
[52] U.S. Cl. .................. 192/0.096; 192/3.3; 192/3.31
[58] Field of Search .................. 192/3.3, 3.31, 0.096

[56] References Cited

U.S. PATENT DOCUMENTS

| | | | |
|---|---|---|---|
| 3,693,478 | 9/1972 | Malloy | 192/3.3 X |
| 4,090,417 | 5/1978 | Burcz et al. | 192/3.3 X |
| 4,428,467 | 1/1984 | Hiramatsu | 192/3.31 |
| 4,473,882 | 9/1984 | Suzuki et al. | 192/3.31 X |
| 4,523,281 | 6/1985 | Noda et al. | 364/424.1 |
| 4,560,043 | 12/1985 | Murasugi et al. | 192/3.31 |
| 4,732,245 | 3/1988 | Hiramatsu | 192/3.3 X |
| 4,744,031 | 5/1988 | Takeda et al. | 74/866 X |
| 4,790,275 | 12/1988 | Iida | 123/325 |
| 4,817,473 | 4/1989 | Baltusis | 192/3.3 X |

FOREIGN PATENT DOCUMENTS 57-33253 2/1982 Japan .
0106174 5/1987 Japan .................. 192/3.3

*Primary Examiner*—Rodney H. Bonck
*Attorney, Agent, or Firm*—Fleit, Jacobson, Cohn, Price, Holman & Stern

[57] ABSTRACT

A torque converter slip control device used in an automatic transmission of an internal combustion engine of a vehicle has a torque converter to transfer engine torque to an input shaft of the automatic transmission. A feed-forward slip control subroutine controls a hydraulic circuit in a feed-forward control to vary the coupling efficiency of a lockup clutch to cause the torque converter to allow slippage at a rate suitable for cancelling a fluctuation of engine torque when the internal combustion engine is at rotational speeds higher than a preselected rotational speed higher than a predetermined fuel injection recovery speed at which an injection of fuel by a fuel system is recovered during the detection of the deceleration state of the vehicle by a deceleration sensor. A feed-back slip control subroutine controls the hydraulic circuit in feed-back control to vary the coupling efficiency of the lockup clutch to make a difference of rotational speed between input and output shafts of the torque converter suitable for cancelling a fluctuation of engine torque when the internal combustion engine is at rotational speeds lower than the preselected rotational speed during the detection of the deceleration state of the vehicle by the deceleration sensor.

11 Claims, 8 Drawing Sheets

TORQUE CONVERTER SLIP CONTROL DEVICE

FIELD OF THE INVENTION

The present invention relates to a control device for controlling an automatic transmission of a vehicle, and more particularly to a torque converter control device for controlling slippage allowed by the torque converter.

BACKGROUND OF THE INVENTION

Normal internal combustion vehicle engines with automatic transmissions produce torque fluctuations caused by inertia due to the reciprocating movement of pistons, pressure fluctuations produced in the internal combustion chambers of cylinders, etc. which are transmitted to driving axles and the car body of the vehicle, resulting in increased vibrations of the car body and a deterioration of fuel economy.

Generally, automatic transmissions are cooperated with torque converters. The normal torque converter allows some slippage, even at cruising speeds. This is due to the fact that the only connection between pump and turbine is the transmission fluid. To prevent this slipping action, and thus improve fuel economy, a number of torque converters are equipped with a lockup feature. For better fuel economy and far more comfortable driving, some automatic transmissions are operative in different drive modes, namely an economy drive mode in which fuel economy is regarded as more important and a power drive mode in which driving power is regarded as more important, which are selected according to driver's preference or driving conditions.

In an attempt at eliminating the transmission of torque fluctuations and, thereby, performing a sufficient transmission of generating power of the vehicle engine, an automatic transmission with a torque converter disclosed in, for example, Japanese Pat. Unexamined Publication No. 57-33253 entitled Torque Transmitter filed Aug. 4, 1980 and laid open Feb. 2, 1982, is adapted to detect slippage produced between input and output shafts of the torque converter and vary the fluid coupling efficiency of a lockup clutch so as to control the torque converter to make the detected slippage substantially equal to an intended slippage.

In more detail, in order to control this slippage action, the lockup clutch is controlled by a slip control device such as one comprising means for detecting the release of an accelerator pedal, timer means for counting the duration of time for which the accelerator pedal is continuously released, feed-forward control means for controlling the lockup clutch with a signal corresponding to a preselected or predetermined slippage to be allowed by the torque converter for a preselected or predetermined period of time after the release of the accelerator pedal, and feed-back control means for controlling the lockup clutch to cause the torque converter to allow an intended target slippage until the release of the accelerator pedal is suspended after the preselected period of time. The torque converter is controlled to allow slippage by controlling the lockup clutch in feed-forward control until the preselected or predetermined duration of time after the release of the accelerator pedal is counted up. Until the release of the accelerator pedal is suspended after the preselected duration of time, the torque converter is controlled to vary slippage by controlling the lockup clutch in feed-back control so as to converge it to the intended target slippage.

According to the above slip control device, during a wide range of fluctuations of engine torque which will be produced immediately after the accelerator pedal is released, the torque converter can be controlled to regulate slippage quickly in feed-forward control for the preselected period of time so as to cancel or absorb such fluctuations of engine torque. After the duration of the preselected period of time at which fluctuations of engine torque become small, the torque converter is controlled in feed-back control so as to allow a minimum slippage which is enough to cancel or absorb the small fluctuations of engine torque.

This slip control device can prevent more effectively the torque converter from being subjected to such an unsteady control as accompanied by hunting which is apt to occur immediately after the release of the accelerator pedal followed by a wide range of fluctuations of engine torque, in comparison with torque converters of the type being controlled only in feed-back slip control. In addition, the slip control device can make a delay of control as small as possible, so as to thereby prevent the vehicle engine from rapidly lowering the speed of its own rotation due to the delay of control. This leads to a prolonged time period of fuel cut-off.

A problem in association with the automatic transmission of the type varying the fluid coupling efficiency of the lockup clutch and being shiftable between the different drive modes, economy and power drive modes, is that the automatic transmission exerts a load on the vehicle engine due to the input and output shafts of the torque converter locked together. The vehicle engine therefore can not exhibit its best accelerating performance due to the load exerted on the engine by the automatic transmission with its input and output shafts locked together. The loads also leads to a loss of the generating power of the vehicle engine, notwithstanding that the vehicle engine should operate with a high accelerating performance during the power drive mode.

Another problem is a difficulty of properly changing the torque converter control between feed-forward and feed-back slip controls responding to various decreasing speeds of rotation of the vehicle engine. This difficulty is caused due to the fact that the slip control device controls the torque converter to operate in feed-forward control during a predetermined period of time immediately after the release of accelerator pedal and in feed-back control after the predetermined period of time and that no engine speed is reflected on changing the torque converter control between feed-forward and feed-back slip controls.

Because, when an engine is decelerated by releasing an accelerator pedal, engine speed or vehicle speed will be lowered at different rates generally according to changing road and load conditions, if engine speed or vehicle speed is lowered at a high rate, the engine speed sometimes becomes excessively lower than a fuel injection recovery speed before the predetermined period of time passes. In this case, it is impossible to increasingly change the time period of fuel injection cut-off by feed-back control around the fuel injection recovery speed at which fluctuations of engine torque is in an narrow range.

It may be permissible to shorten the predetermined period of time during which the slip control device controls the torque convertor to operate in feed forward control, in order to deal with the fact that it is impossible to increase the fuel injection cut-off time period. However, if the predetermined period of time is shortened too much, the vehicle engine sometimes remains in a speed range wherein relatively large fluctuations of engine torque after the shortened predetermined period of time are caused. In such a case, the torque converter by feed-back control, can not cancel the large fluctuations of engine torque, resulting in unsteady slip control such as hunting.

OBJECT OF THE INVENTION

It is, therefore, an object of the present invention to provide a torque converter slip control device of a vehicle automatic transmission which can prolong a fuel injection cutoff time period while the vehicle is in deceleration so as to cancel fluctuations of engine torque.

SUMMARY OF THE INVENTION

For achieving the above object, the present invention provides a control device for an automatic transmission of an internal combustion engine of a vehicle having a torque converter equipped with a lockup clutch to transfer engine torque to a transmission input shaft and slip varying means for varying a coupling efficiency of the lockup clutch so as to control slippage allowed by the torque converter, the control device comprising deceleration detecting means cooperating with, such as, an accelerator pedal for detecting a decelerating state of said vehicle; and slip control means for controlling the slip varying means either at a constant duty rate in feed-forward control until an engine speed of the vehicle engine becomes equivalent to a speed higher than a preselected speed higher than a predetermined fuel injection recovery speed at which fuel injection is recovered after the deceleration detecting means detects the vehicle in decelerating or at a duty rate in feed-back control suitable for making slippage allowed by the torque converter equivalent a target slippage until the vehicle escapes from deceleration after an engine speed has been lowered under the preselected speed.

According to the torque converter slip control device, when the slip varying means is controlled at a duty rate maintained constant in feed-forward control until an engine speed becomes lower than a speed higher than the preselected speed after the detection of the vehicle in deceleration, slippage allowed by the torque converter is limited to be suitable for canceling fluctuations of engine torque and the slip varying means is actuated substantially simultaneously with the detection of the vehicle in deceleration without any time lag of control. Therefore, the vehicle engine is prevented from being rapidly lowered in speed, resulting in a prolonged fuel injection cut-off time period and a comfortable control of operation of the torque converter with no accompanying hunting.

Furthermore, after an engine speed is lowered to be equivalent to the preselected engine speed while the vehicle is in deceleration, the slip control means controls the slip varying means in feed-back control to make an actual slippage allowed by the torque converter equivalent to a target slippage which is properly the smallest but enough to cancel fluctuations of engine torque. This results in a more prolonged fuel injection cut-off time period.

BRIEF DESCRIPTION OF THE DRAWINGS

This invention will be described with reference to its preferred embodiment shown in the accompanying drawings in which:

FIGS. 3B-1 and 3B-2 are a flow chart illustrating a slip control sequence for the CPU of the control unit in the torque converter control device of FIG. 1;

DETAILED DESCRIPTION OF THE INVENTION

Figure 1:
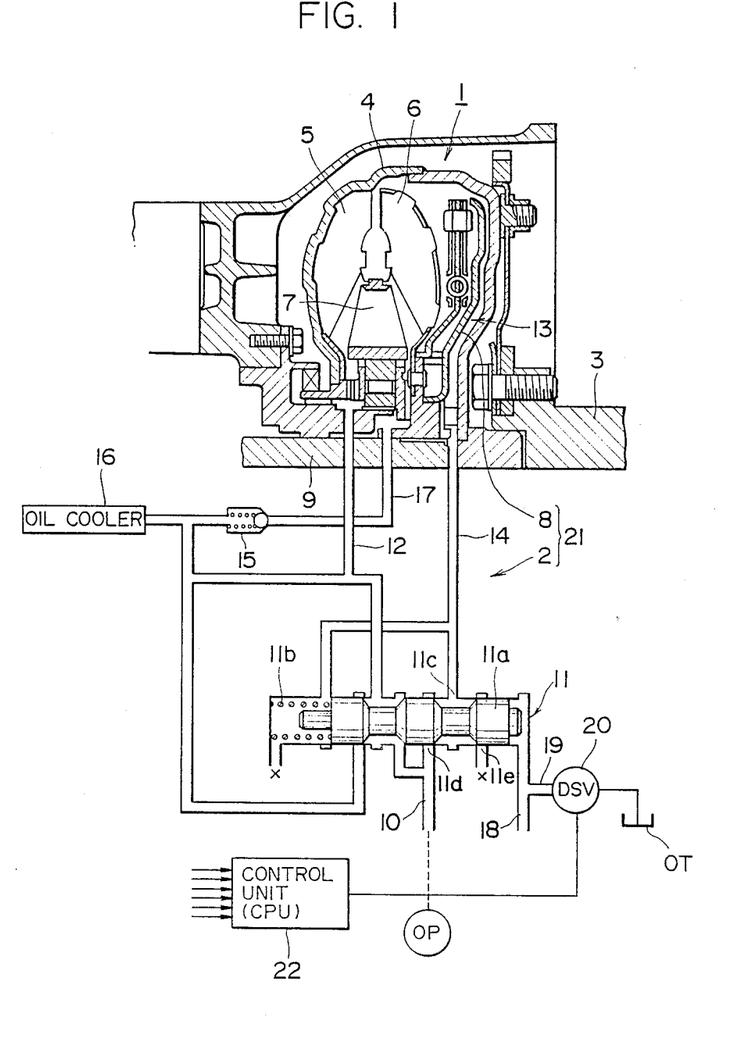
FIG. 1 is a schematic view, partially in cross section, of a torque converter control device according to the present invention.

Referring now to FIG. 1, there is shown a torque converter 1 and a hydraulic control circuit 2 for the torque converter 1. As shown, the torque converter 1 uses a driver and a driven torus, generally referred to as a pump 5 and a turbine 6, and a stator 7. The pump 5 is disposed within and attached to a half of a converter housing 4 coupled to an engine output shaft 3 so as to be rotatably integral with the engine shaft 3. The turbine 6 is disposed within another half of the housing 4 for rotation and connected to an output shaft 9. As is well known, a special lightweight oil is used as a fluid coupling to transmit engine torque from the pump 5 to the turbine 6 with or without torque multiplication. A stator 7 is mounted on a stationary shaft between the pump 5 and the turbine 6 which works to intercept the oil thrown off by the turbine 6 and redirect the path of this oil, so the oil will enter the pump 5 smoothly. As the pump 5 begins to spin, oil is thrown outward into curved vanes of the turbine 6. The oil then circulates around through the turbine vanes. Instead of being discharged back into the pump vanes, the oil is first passed through the stator 7. Torque multiplication is only possible when there is a difference in the speeds of the pump 5 and turbine 6. The greater the speed difference is, the greater the torque multiplication becomes. This torque converter 1 is equipped with a lockup unit or lockup clutch 8 which locks together the pump 5 and turbine 6. When lockup pressure is released to unlock the lockup clutch 8, the torque converter 1 will operate as a standard torque converter. On the other hand, lockup pressure is applied against the lockup clutch 8 thus locking the torque converter 1, it will operate as a solid drive unit with no slippage between the pump 5 and the turbine 6.

The torque converter 1 cooperates with hydraulic control circuit 2 through pressure oil lines defined by oil pipes, namely a pressure supply line 12, a pressure relief line 17 and an oil relief line 14. The hydraulic control circuit 2 includes an oil pump OP by which the hydraulic oil is pumped up and supplied to the torque converter 1 through a main oil line 10 to a lockup valve 11 and the oil supply line 12. Due to pressure of the hydraulic oil applied to the torque converter 1, the lockup clutch 8 is normally actuated to lock together the pump 5 and turbine 6. The lockup release line 14 communicates the lockup valve 11 with a space 13 defined between the lockup clutch 8 and the housing 4 for supplying the hydraulic oil into the space 13 to release the lockup clutch 8 so as to render the pump 5 and turbine 6 rotationally free from each other, thereby allowing some slippage therebetween. The hydraulic oil in the torque converter 1 is relieved and transmitted to an oil cooler 16 through the oil relief line 17 in which a pressure maintaining valve or fail-safe valve 15 is disposed.

Figure 8:
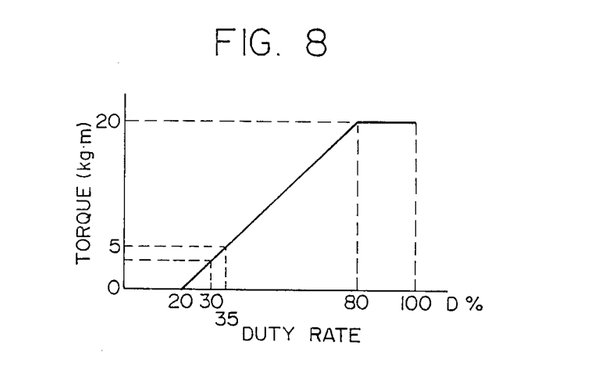
FIG. 8 is a diagram showing a torque transfer schedule.

The lockup valve 11 comprises a spool 11a slidably received in a valve body, a spring 11b for urging the spool 11a to the right hand side as viewed in FIG. 1, a port 11c at which the oil relief line 14 opens to the inside of the valve body, a pressure regulating port 11d and a drain port 11e disposed on the opposite sides of the pressure regulating port 11c and open to the inside of the lockup valve body. At the regulating port 11d, the main pressure line 10 opens to the inside of the valve body. The valve body is further connected with a control pressure line 18 at the right end as viewed in FIG. 1 through which a pilot pressure is exerted on the one end of the spool 11a. This control pressure line 18 branches into two, one of which is a drain oil line 19 in which a duty solenoid valve (DSV) 20 is disposed. This duty solenoid valve (DSV) 20 is intermittently energized at a duty rate D so as to repeatedly open and close the drain oil line 19 at very short intervals in order to regulate the pilot pressure according to the duty rate D. The spool 11a of the lockup valve 11 receives the regulated pilot pressure on its one end and, on the other hand, the relieved pressure of the pressure relief line 14 on its opposite side so as to slidably axially move to the left or right hand side against or by the aid of the spring 11b, thereby opening and closing the pressure regulating port 11d and the drain port 11e. In this way, relief pressure is regulated equivalent to pilot pressure according to the duty rate D. At a maximum duty rate D, the drained amount of hydraulic oil from the control oil line 18 becomes largest so as to make the pilot pressure, and hence the relief pressure, lowest, thereby to cause the lockup clutch 8 to completely couple together the pump 5 and turbine 6. On the other hand, at a minimum duty rate D, the drained amount of hydraulic oil becomes smallest so as to make the pilot pressure, and hence the relief pressure, highest, thereby to cause the lockup clutch 8 to render the pump 5 and turbine 6 rotatable freely from each other. As is well known, at duty rates D between the maximum and minimum ratios, the lockup clutch 8 allows some slippage between the pump 5 and turbine 6. This slip action is controlled by relief pressure regulated according to the duty rates D. As is apparent from the above, by the lockup clutch 8 and the hydraulic control circuit 2, slip control means 21 which controls slippage allowed between input and output shafts of the torque converter 1 is formed. In more detail, as is shown in FIG. 8, the transmission of torque of the lockup clutch 8 is varied with changes of the duty rate D. The duty solenoid valve (DSV) 20 operates to remove a maximum amount of pressure oil in the control oil line 18 so as to lock the lockup clutch 8 while it is energized at a duty rate of 100% or to apply a maximum oil pressure in the control oil line 18 so as to release the lockup clutch 8 while energized at a duty rate of 0%. By varying the duty rate D between 100 and 0% at which the duty solenoid valve (DSV) 20 is energized, the oil pressure in the control oil line 18 is varied. As a result, pressure applied to the one end of the spool 11a of the lockup valve 11 correspondingly varies. According to the difference between pressures applied to the one and the other ends of the spool 11a, the spool 11a slidably moves in the axial direction to alternately connect the regulating pressure line 10c with main pressure line 10 and the drain port 11e so as to finally adjust pressure at the pressure regulating port 11c equal to the pressure in the drain pressure line 18 in order to control lockup pressure for the lockup clutch 8.

Figure 2:
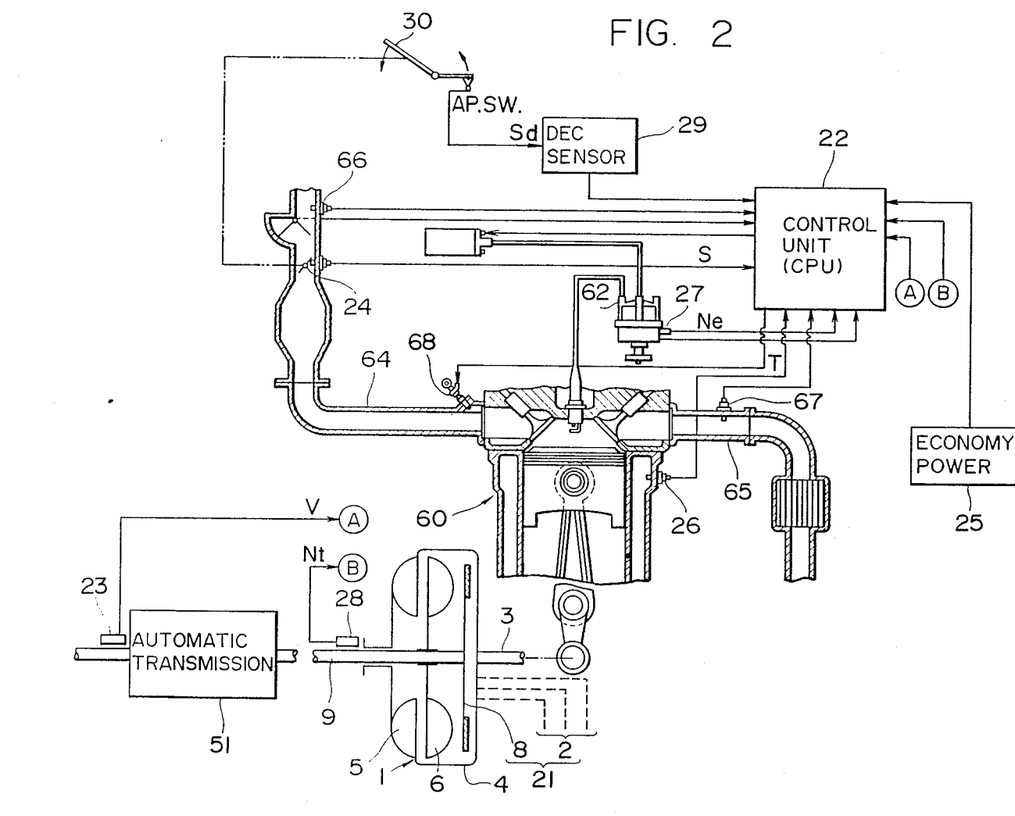
FIG. 2 is a schematic illustration of a vehicle engine equipped with an automatic transmission for use with the torque converter control device of FIG. 1.

As is shown in FIGS. 1 and 2, operation of the slip control means 21 is controlled by a control unit 22 mainly comprising a microcomputer or a central processing unit (CPU). This control unit 22 receives various control signals provided by a vehicle speed sensor 23, a throttle opening or position sensor 24, a drive mode selection switch 25, a coolant temperature sensor 26, an engine speed sensor 27, a turbine speed sensor 28, and a deceleration (Dec.) sensor 29. Because operation and fabrication of all these sensors themselves are well known to those skilled in the art, a detailed description need not be made herein. The deceleration sensor 29 cooperates with an accelerator pedal switch AP which is turned on by releasing the accelerator pedal 30 to provide a deceleration signal Sd indicating that the vehicle is decelerated.

Figure 5:
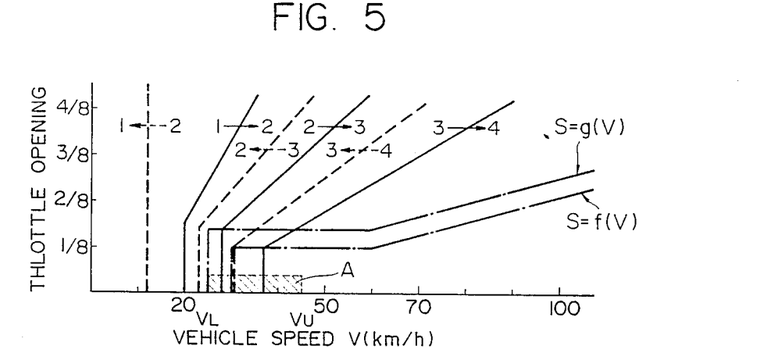
FIG. 5 is a diagrammatic map illustrating a throttle opening-vehicle speed schedule by way of example.

The control unit 22 has a ROM which has memorized therein various data on speed such as a fuel injection cut-off speed Nc at which the delivery of fuel into cylinders of the engine is shut off when the vehicle is decelerated, a fuel injection recovery speed Nr at which the delivery of fuel is restarted, a preselected speed Ns (usually larger than several hundreds rpm) near but larger than the fuel injection recovery speed Nr, and a slip control schedule in the form of a speed map shown in FIG. 5 indicating a speed range A defined by upper and lower limit speeds VU and VL, wherein deceleration slip control should be conducted. According to the various signals from the above-mentioned sensors, the slip control unit 21 executes slip controls.

Figure 3A:
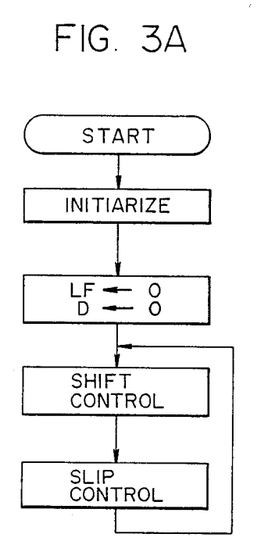
FIG. 3A is a flow chart illustrating a general sequence for the CPU of a control unit used in the torque converter control device of FIG. 1.
Figure 3B:
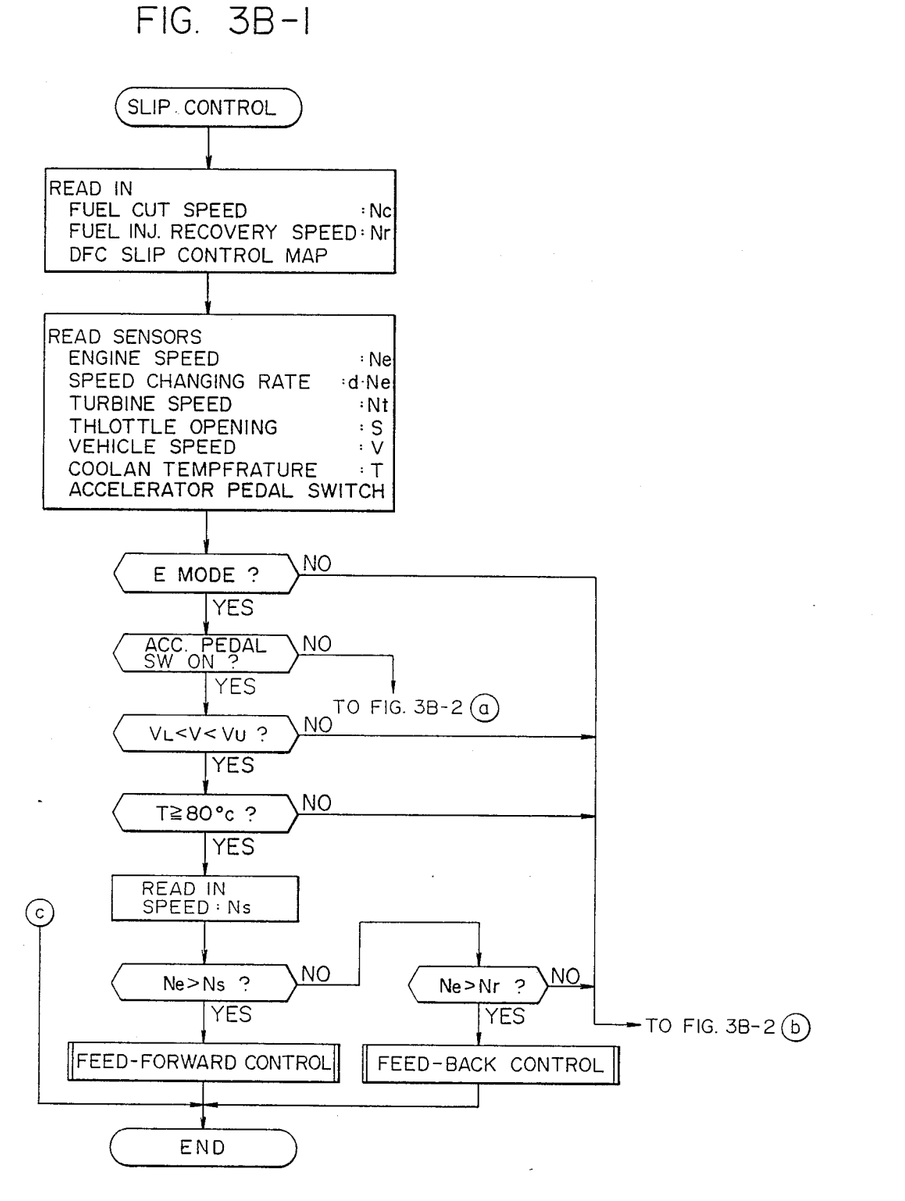
Figure 3B:
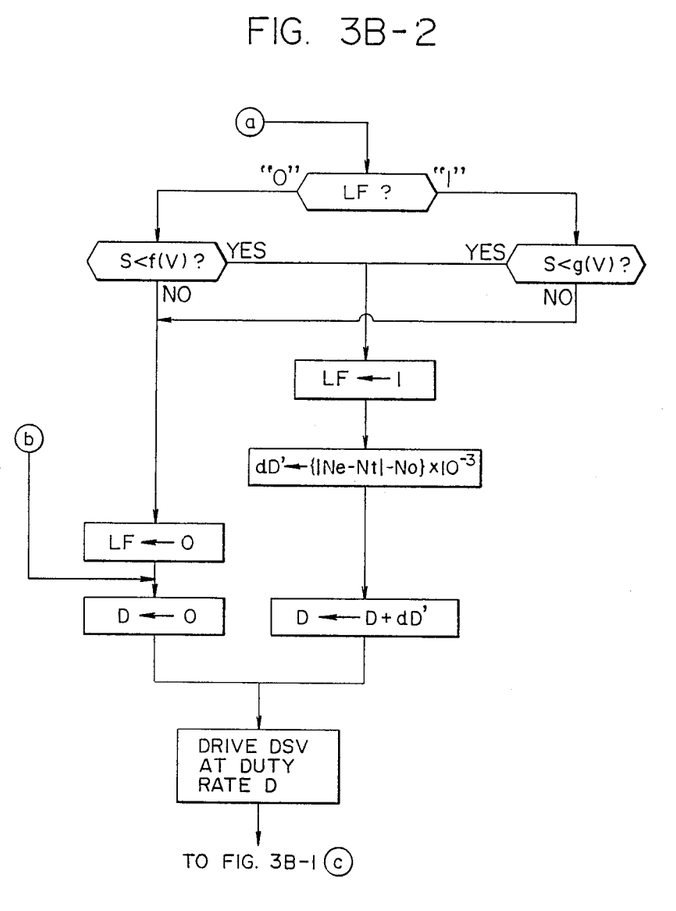
Figure 3C:
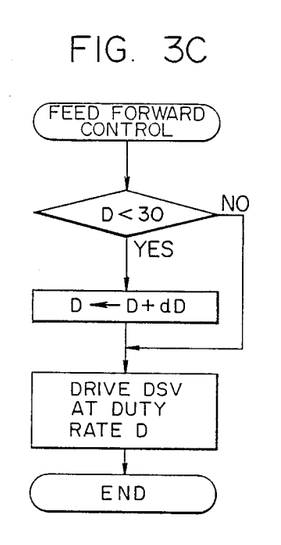
FIG. 3C is a flow chart illustrating a feed-forward slip control subroutine for the CPU of the control unit in the torque converter control device of FIG. 1.
Figure 3D:
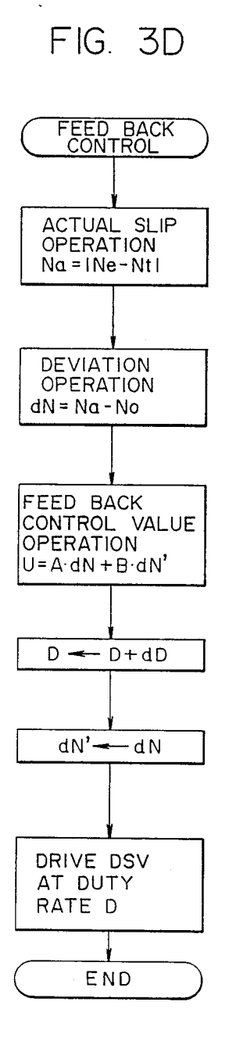
FIG. 3D is a flow chart illustrating a feed-back slip control subroutine for the CPU of the control unit in the torque converter control device of FIG. 1.
Figure 4:
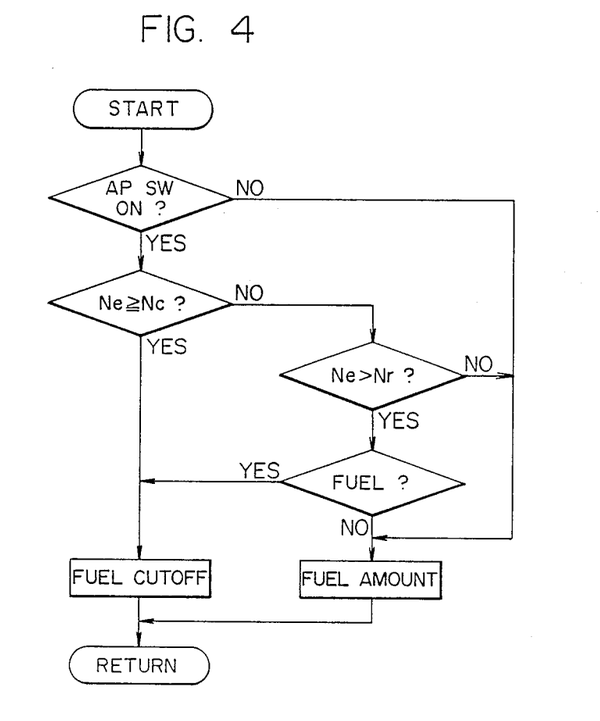
FIG. 4 is a flow chart illustrating a general routine of fuel injection control.

The operation of the slip control device of the torque converter depicted in FIGS. 1 and 2 is best understood by reviewing FIGS. 3 and 4, which are flow charts illustrating various routines for the CPU of the control unit 22. Programming a microcomputer or a CPU is a skill well understood in the art. The following description is written to enable a programmer having ordinary skill in the art to prepare an appropriate program for the CPU of the control unit 22. The particular details of any such program would of course depend upon the architecture of the particular computer selection.

Referring now to FIG. 3A, which is a flow chart of the main sequence for the CPU of the control unit 22. The first step in FIG. 3A is to initialize the control device. The control unit 22 sets lockup flag LF indicating the state of the lockup clutch 8 to the initial state (LF=0) which indicates that the lockup clutch 8 is unlocked) and the duty rate D for the duty solenoid valve (DSV) 20 to an initial value of zero (0%). After the automatic transmission is automatically shifted in a well known manner, slip control is repeated in a slip control sequence shown in FIG. 3B.

Figure 7:
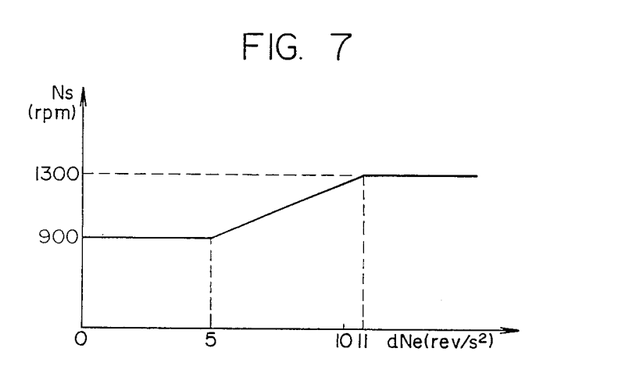
FIG. 7 is a diagram showing a preselected speed schedule.

Referring to the slip control routine in FIGS. 3B-1 and 3B-2, the first step in FIG. 3B-1 is to read in the control signals, namely, the fuel cut and fuel recovery speed signals Nc and Nr and the slip control speed map shown in FIG. 5 from the ROM and, thereafter, an engine speed Ne , an engine speed changing rate dNe, a vehicle speed V, a turbine speed Nt, a coolant temperature T, a throttle opening S, and a deceleration signal D provided by the respective sensors. Then, a decision is made; "is the vehicle operated in the economy operating mode E?" It will be recalled from the previous description that the economy operating mode E will assume a fuel economy priority operating mode. If the answer to the first decision is yes, a decision is made; "is the accelerator pedal switch AP turned on?" For this decision, the control unit 22 reads the present condition of the deceleration sensor 29 to determine the presence or absence of the deceleration signal D from the accelerator pedal switch AP. If the answer is yes indicating the absence of the deceleration signal D, that is, the accelerator pedal is released to decelerate the engine speed, then, another decision is made; "does the present vehicle speed V fall in the deceleration slip control range shown by a reference character A in FIG. 5 defined by the extreme speeds VL and VU?" If the vehicle speed V is in the deceleration slip control range A, the present coolant temperature T is as to whether it is or is not lower than a preselected temperature, for example approximately 80°C in this embodiment . If the coolant temperature T is not lower than 80°C, the control unit 22 reads out a preselected speed Ns according to an engine speed changing rate $N_e'$ or dNe from the ROM. The preselected speed Ns is given as is shown in FIG. 7. Thereafter, a decision is made; "is the engine speed Ne is larger than the preselected speed Ns read out from the ROM?" If the answer is yes, a feed-forward control subroutine is called for.

Referring now to FIG. 3C, which is a flow chart of the feed-forward control subroutine, the first step in FIG. 3C is to make a decision whether the present duty rate D is smaller than a preselected duty rate, for example in this embodiment 30% If the duty rate D is smaller than 30%, then, to the present duty rate D is added a small value of compensation duty rate dD, which is, for example, fixedly given as approximately 3% of a current duty rate D. According to the current duty rate D, the duty solenoid valve (DSV) 20 is excited so that the slip control means 21 controls the lockup clutch 8, causing the torque converter 1 to allow some appropriate slippage between its input and output shafts so as to cancel or absorb a fluctuation of engine torque.

On the other hand, if the duty rate D is not smaller than 30%, the duty solenoid valve is excited at the duty rate D.

Referring back to FIG. 3B-1, if the decision regarding the engine speed Ne is no, a further decision is made: "is the engine speed Ne larger than the fuel recovery speed Nr?" The yes decision calls for a feed-back slip control subroutine.

Referring to FIG. 3D, which is a flow chart of the feed-back slip control subroutine, the first step in FIG. 3D is to operate an actual slippage Na allowed by the torque converter 1 which is given as an absolute difference between the engine speed Ne and the turbine speed Nt. Thereafter, the deviation dN of the actual slippage Na thus obtained relative to the target slippage No is operated.

After these operations, the control unit 22 reads in control parameters A and B, which may be either constant or variable, and calculates a feed-back control value U by using the following equation:

$$U = A \times dN + B \times dN'$$

where dN' is the deviation of the actual slippage relative to the target slippage obtained in the last control. In this embodiment, these control parameters are, for example, 2.5 and 2.0, respectively.

Figure 6:
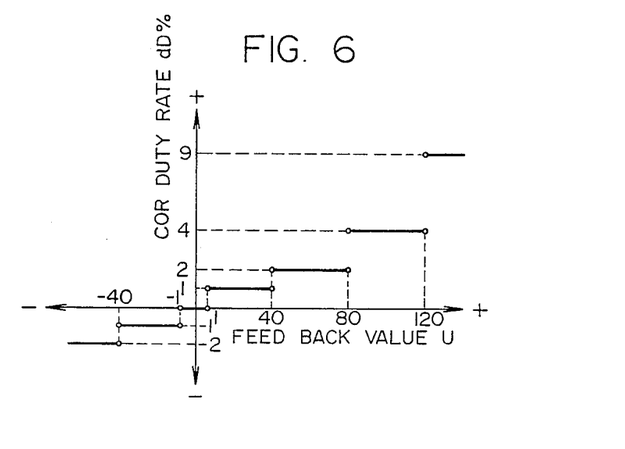
FIG. 6 is a diagram showing a correction duty rate schedule.

In FIG. 3D, the next step in the feed-back control subroutine is to set a correction value dD for the duty rate D corresponding to the feed back control value U obtained in the previous step. This correction value dD is set based on a graph shown in FIG. 6. With the current duty rate D additionally corrected by the correction value dD, the last duty rate D in the last control is replaced. The CPU of the control unit 22 replaces the deviation dN' in the last control with the current deviation dN. Thereafter, the CPU of the control unit 22 provides the slip control means 21 with drive control signals to drive the duty solenoid valve 20 at the duty rate D and then orders return to the slip control routine.

Referring back to the slip control subroutine in FIGS. 3B-1 and 3B-2, if the answer to any one of the decisions regarding the present engine speed being within the slip control range, the coolant temperature T being not lower than 80°C, and the engine speed Ns being higher than the fuel cut speed Vc is no, the CPU of the control unit 22 advances directly to the setting the duty rate equivalent to zero percent (0%).

In the slip control subroutine in FIG. 3B-1, if the answer to the decision regarding closing of the accelerator pedal switch AP is no, indicating that the accelerator pedal 30 is pressed down and, therefore, the vehicle engine speed is accelerated, the first decision in FIG. 3B-2 is made; "which state is the lockup flag LF, LF=1 and LF=0?" Regardless of the decision, the throttle opening S detected by the throttle sensor 24 is compared with a boundary-opening relative to the present vehicle speed V; specifically with an approach boundary-opening S=f(V) at the present vehicle speed V if the lockup flag LF=0 is judged; or with an escape boundary-opening S=g(V) at the present vehicle speed V if the lockup flag LF=1 is judged, this indicates that the torque converter 1 has been locked up by the lockup clutch 8. These boundary-openings are read based on the throttle opening map shown in FIG. 5. If the yes decision is made, this indicates that the throttle opening S is smaller than either the escape boundary-opening g(V) or the approach boundary-opening f(V), namely that the throttle opening is within the slip lock control range. Then, after setting the lockup flag LF to LF=1, slip control is effected by controlling the duty rate D for the duty solenoid valve (DSV) 20.

For slip control, a correction duty rate dD' is calculated based on the deviation dN of the actual slippage Na (=Ne−Nt) from the target slippage No. Specifically, the correction duty rate dD' is given by the following equation:

$$dD' = [|Ne - Nt| - No] \cdot 10^{-3}$$

The correction duty rate dD' is added to the present duty rate D. Thereafter, the CPU of the control unit 22 provides the slip control means 21 with drive control signals to drive the duty solenoid valve (DSV) 20 at the duty rate replaced with the sum of the present duty rate D and the correction duty rate dD' and completes the slip control subroutine.

Otherwise, the no decision in either decision regarding the throttle opening S being smaller than a boundary-opening g(V) or f(V) indicates that the lockup clutch 8 is to be maintained released to cause the torque converter 1 to allow slippage according to road and engine load conditions. Then, the CPU of the control unit 22, after setting the lockup flag LF to LF=0, sets the duty rate D equivalent to zero percent (0%) and causes the slip control means 21 to drive the duty solenoid valve (DSV) 20 at the duty rate of 0% so as to release the lockup clutch 8, thereby to unlock the torque converter 1. Then the slip control subroutine is completed.

In the event the decisions regarding the vehicle speed V being in the slip control speed range, the coolant temperature being not lower than 80C, and the engine speed being not smaller than the fuel injection recovery speed Nr, respectively, are no the CPU of the control unit 22 directly advances to the step of setting the duty rate equivalent to zero percent (0%) and then causes the control means 21 to drive the duty solenoid valve (DSV) 20 at the duty rate thus set.

In the feed-back slip control as described above, if the current and the last deviations dN and dN' are negative, indicating that the actual slippage Na is smaller than the target slippage No, the feed-back control value U and the correction value dD for the duty rate D are also negative. Therefore, during the feed-back slip control the duty rate D becomes gradually smaller to increase the amount of oil drained through the duty solenoid valve (DSV) 20, increasing pilot pressure exerted onto the spool 11a of the lockup pressure regulating valve 11, and hence releasing pressure for the lockup clutch 8. Consequently, the lockup clutch 8 is controlled to allow the torque converter 1 to produce an increased actual slippage Na so as to gradually bring it close to the target slippage No.

On the other hand, if the current and the last deviation dN and dN' are positive, indicating that the actual slippage Na is larger than the target slippage No, the duty rate D will gradually become large to decrease releasing pressure for the lockup clutch 8, so that the lockup clutch 8 is controlled to gradually increase its lockup force, causing the torque converter 1 to produce a decreased actual slippage Na so as to gradually bring it close to the target slippage No. It is noted that if signs of the present and last deviations dN and dN' are opposite, that is, an actual slippage Na is substantially equivalent to the target slippage No, a feed-back control value U and a correction value dD are zero or close to zero. The actual slippage Na is maintained so as to be substantially equal to or close to the target slippage No.

Referring now to FIG. 4, which is a flow chart of a fuel injection control routine for the CPU of the control unit 22, the first step in FIG. 4 is to make a decision: "is the accelerator switch AP turned on?" If the answer is yes, this indicates that the vehicle is decelerated. Then, another decision is made: "is the engine speed Ne as high as or higher than the fuel injection cut-off speed NC?" If the answer to the other decision is yes, the control unit 22 causes the fuel injector 68 to cut off fuel injection. Otherwise, the answer to the other decision is no, and a third decision is made: "is the engine speed Ne higher than the fuel injection recovery speed Nr?" If the engine speed Ne is higher than the fuel injection recovery speed Nr, a final decision is made: "is fuel still cut off?" If fuel is still cut off in spite of the engine speed Ne being higher than the fuel injection recovery speed Nr, the fuel injector 68 continues to cut off fuel injection. In the event of a no decision, the control unit 22 decides the amount of fuel to be injected through the fuel injector 68. This fuel injection control routine is started every firing.

According to the torque converter slip control device thus constructed, until the engine speed Ne of the vehicle engine is lowered to the preselected speed Ns after the vehicle is detected to be in a deceleration state by the deceleration detecting sensor 29, the lockup clutch 8 is controlled by the slip control means 21 of which the duty solenoid valve (DSV) 20 is actuated at a duty rate D maintained constant in feed-forward control so as to cause the torque converter 1 to allow slippage suitable for canceling a fluctuation of engine torque. When, the engine speed Ne becomes lower than the preselected speed Ns, the torque converter 1 is then controlled not in feed-forward slip control but in feed-back slip control. Thereafter, the torque converter 1 is, until the vehicle is accelerated by pressing again the accelerator pedal 30, controlled so as to converge an actual slippage Na allowed thereby to a target slippage small enough to cancel a fluctuation of engine torque during acceleration.

Figure 9A:
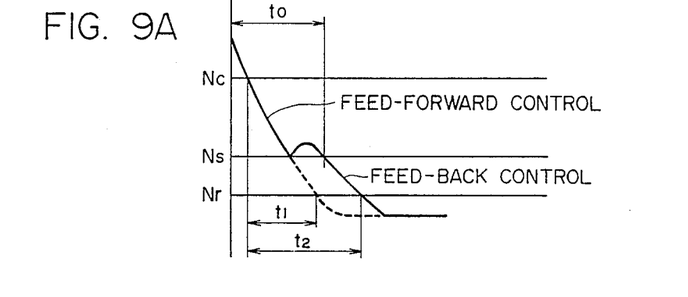
FIG. 9A and 9B are diagrams showing control changing timing of the torque converter control device of the present invention in comparison with that of prior art.
Figure 9B:
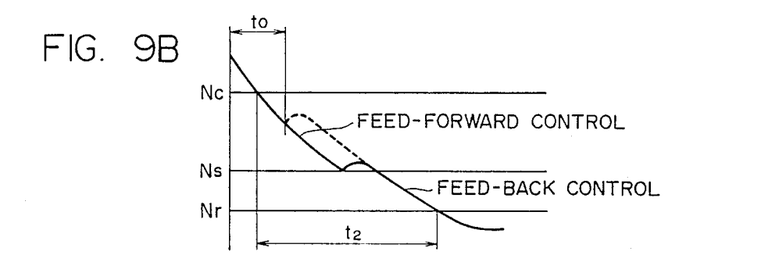

For more detailed description of significant results of the torque converter control device according to the present invention in comparison with the prior art which was previously described, reference is now had to FIGS. 9A and 9B wherein a broken line shows the prior art and a solid line the present invention. As shown in FIG. 9A, in the prior art torque converter control device, when an engine speed Ne becomes lower than the fuel injection recovery speed Nr before the duration of the preselected time period $t_0$, it becomes impossible to prolong the fuel injection cut-off time period in feed-back control and, therefore, the fuel injection cut-off time period is restricted by time $t_1$ during feed-forward slip control. On the other hand, in the torque converter control device of the present invention, when an engine speed Ne becomes lower than the preselected speed Ns set slightly higher than the fuel injection recovery speed, the torque converter 1 is then controlled not in feed-forward slip control but in feed-back slip control, thereby prolonging the fuel injection cut-off time period to a longer time $t_2$. In this case, since the vehicle engine, at the time control of the torque converter 1 is changed from feed-forward slip control to feed-back slip control, has been at speeds within a speed range in which fluctuations of engine torque of the vehicle engine are small, the vehicle engine is controlled stably without being followed by hunting.

In the case of the preselected time period $T_0$ shortened as is shown in FIG. 9B, it is apprehended that the prior art torque converter control device results in an unfavorable operation if the deceleration rate of engine speed Ne is not so large. That is, if the engine speed Ne of the vehicle engine is still within a range wherein the vehicle engine makes relatively large flctuations of engine torque after the preselected time period $t_0$, the torque converter 1 will, thereafter, be possibly controlled with hunting in feed-back control. By contrast, in the torque converter control device of the present invention, because control of the torque converter 1 is changed to feed-back slip control after the engine speed Ne of the vehicle engine is lowered to the preselected speed Ns, fluctuations of engine torque are relatively small in feed-back slip control and, therefore, the torque converter 1 can be controlled stably without hunting.

Figure 10:
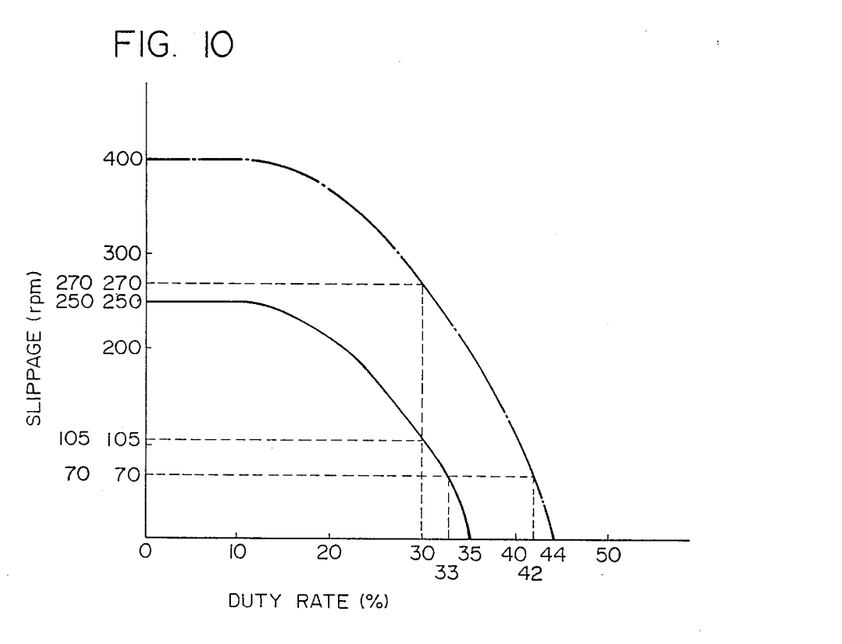
FIG. 10 is a graph showing a relationship between slippage and duty rate.

FIG. 10 shows the relation between slippage in rpm of the torque converter and duty rate D when the vehicle is in deceleration by a dotted curve when the vehicle engine is idling at an engine speed of 1300 rpm and by a solid curve when the vehicle engine is idling at an engine speed of 300 rpm.

The present invention has been fully described in detail with particular reference to a preferred embodiment, but it will be understood that variations and modifications can be effected within the scope of the invention.

What is claimed is:

1. A control device for an automatic transmission of an internal combustion engine of a vehicle which has a torque converter, a lockup clutch and slip varying means for varying a fluid coupling efficiency of said lockup clutch so as to control slippage allowed by the torque converter, and a fuel injection system for delivering a required quantity of fuel into said internal combustion engine, said control device comprising:

deceleration detecting means for detecting a decelerating state of said vehicle;

fuel injection cut-off means for cutting off an injection of fuel by said fuel injection system when said internal combustion engine is at rotational speeds lower than a predetermined fuel injection cut-off speed while said deceleration detecting means detects said vehicle in said decelerating state;

feed-forward slip control means for controlling said slip varying means in feed-forward control to vary said fluid coupling efficiency of said lockup clutch so as to cause said torque converter to allow slippage at a rate suitable for cancelling a fluctuation of engine torque when said internal combustion engine is at rotational speeds higher than a preselected rotational speed higher than a predetermined fuel injection recovery speed at which an injection of fuel by said fuel system is recovered while said deceleration detecting means detects said vehicle in said decelerating state; and feed-back slip control means for controlling said slip varying means in feed-back control to vary said fluid coupling efficiency of said lockup clutch so as to make a difference of rotational speed between input and output shafts of said torque converter suitable for canceling a fluctuation of engine torque when said internal combustion engine is at rotational speeds lower than said preselected rotational speed while said deceleration detecting means detects said vehicle in said deceleration state.

2. A control device as defined in claim 1, wherein said fuel injection cut-off speed is higher than said fuel injection recovery speed.

3. A control device as defined in claim 2, wherein said preselected rotational speed is lower than said fuel injection cut-off speed and is higher than said fuel injection recovery speed.

4. A control device as defined in claim 1, wherein said deceleration detecting means is means for detecting a throttle valve in an idle position.

5. A control device a defined in claim 1, wherein said slip varying means controls actuating oil pressure for said lockup clutch at a variable duty rate.

6. A control device as defined in claim 5, wherein said feed-forward slip control means controls said slip varying means to control actuating oil pressure for said lockup clutch at a constant duty rate.

7. A control device as defined in claim 6, wherein said feed-forward slip control means controls said slip varying means to control actuating oil pressure for said lockup clutch at a gradually increasing duty rate when said vehicle enters into a feed-forward slip control range.

8. A control device as defined in claim 1, wherein said preselected rotational speed is high when the deceleration rate of rotational speed of said vehicle engine is higher than a particular rate.

9. A control device as defined in claim 1, wherein said lockup clutch is released when said vehicle is at a speed higher than a preselected high speed while said deceleration detecting means detects said vehicle in said deceleration state.

10. A control device as defined in claim 1, wherein said lockup clutch is released when a throttle valve is in an idle position and an engine coolant is at a temperatures lower than a preselected coolant temperature.

11. A control device for an automatic transmission of an internal combustion engine of a vehicle which has a torque converter, a lockup clutch and slip varying means for varying a fluid coupling efficiency of said lockup clutch so as to control slippage allowed by the torque converter according to engine operating conditions, and a fuel injection system for delivering a required quantity of fuel into said internal combustion engine, said control device comprising:

deceleration detecting means for detecting a decelerating state of said vehicle;

drive mode detecting means for detecting whether said vehicle is in an economy drive mode or in a power drive mode;

fuel injection cut-off means for cutting off an injection of fuel by said fuel injection system when said internal combustion engine is at rotational speeds lower than a predetermined fuel injection cut-off speed while said deceleration detecting means detects said vehicle in said decelerating state;

feed-forward slip control means for controlling said slip varying means in feed-forward control to vary said fluid coupling efficiency of said lockup clutch so as to cause said torque converter to allow slippage at a rate suitable for canceling a fluctuation of engine torque when said internal combustion engine is at rotational speeds higher than a preselected rotational speed higher than a predetermined fuel injection recovery speed at which an injection of fuel by said fuel system is recovered while said deceleration detecting means detects said vehicle in said decelerating state;

feed-back slip control means for controlling said slip varying means in feed-back control to vary said fluid coupling efficiency of said lockup clutch so as to make a difference of rotational speed between input and output shafts of said torque converter suitable for canceling a fluctuation of engine torque when said internal combustion engine is at rotational speeds lower than said preselected rotational speed while said deceleration detecting means detects said vehicle in said decelerating state; and preventing means for preventing said lockup clutch from being activated when said drive mode detecting means detects said vehicle in said power drive mode.

* * * * *